(12) United States Patent
Heffron et al.

(10) Patent No.: US 11,110,889 B2
(45) Date of Patent: Sep. 7, 2021

(54) PARKING ENFORCEMENT SYSTEM

(71) Applicant: Ideas That Stick LLC, New York, NY (US)

(72) Inventors: Colin Heffron, Upper Brookville, NY (US); Kevin Dougherty, New York, NY (US); Robert White, Midland Park, NJ (US); Christian Kreske, Hoboken, NJ (US); Russ Marks, Epsom (GB); Tony Gerrard, Redhill (GB)

( * ) Notice: Subject to any disclaimer, the term of this patent is extended or adjusted under 35 U.S.C. 154(b) by 425 days.

(21) Appl. No.: 16/311,898

(22) PCT Filed: Jul. 28, 2016

(86) PCT No.: PCT/US2016/044364
§ 371 (c)(1),
(2) Date: Dec. 20, 2018

(87) PCT Pub. No.: WO2018/022049
PCT Pub. Date: Feb. 1, 2018

(65) Prior Publication Data
US 2020/0307511 A1    Oct. 1, 2020

(51) Int. Cl.
*B60R 25/01*    (2013.01)
*F16B 47/00*    (2006.01)
(Continued)

(52) U.S. Cl.
CPC ............ *B60R 25/01* (2013.01); *B60R 25/016* (2013.01); *B60R 25/23* (2013.01); *E05B 45/06* (2013.01);
(Continued)

(58) Field of Classification Search
CPC ....... B60R 25/01; B60R 25/016; B60R 25/23; B60R 25/1004; B60R 25/00; B60R 25/33;
(Continued)

(56) References Cited

U.S. PATENT DOCUMENTS 1,464,186 A    8/1923  Oberreich
1,663,044 A    3/1928  Furlong
(Continued)

FOREIGN PATENT DOCUMENTS

CN   102881184 A    1/2013
DE       581812 C    8/1933
(Continued)

*Primary Examiner* — Brian E Miller
(74) *Attorney, Agent, or Firm* — Charles F. Charpie

(57) ABSTRACT

A parking enforcement system configured to impair the view of a driver through a windshield of a vehicle is provided. The parking enforcement system includes a plurality of covering assemblies. Each of the covering assemblies has one or more suction assemblies configured for placement against a windshield of a vehicle. A pump assembly is configured for pneumatic communication with the one or more suction assemblies. The pump assembly is configured to develop a partial vacuum between the suction assemblies and the windshield. A release assembly is configured for pneumatic communication with the one or more suction assemblies. The release assembly has a servo motor configured to actuate release of the suction assemblies from the windshield.

16 Claims, 9 Drawing Sheets

(51) Int. Cl.
*E05B 45/06* (2006.01)
*E05B 73/00* (2006.01)
*B60R 25/23* (2013.01)
*E05B 77/00* (2014.01)
*E05B 27/00* (2006.01)

(52) U.S. Cl.
CPC .............. *F16B 47/00* (2013.01); *E05B 27/00* (2013.01); *E05B 73/00* (2013.01); *E05B 77/00* (2013.01)

(58) Field of Classification Search
CPC ..... B60R 2011/0056; B60R 2011/0026; E05B 45/06; E05B 77/00; E05B 73/00; E05B 27/00; F16B 47/00; B60J 11/08; B60J 1/06; H04W 4/029
See application file for complete search history.

(56) References Cited

U.S. PATENT DOCUMENTS

| | | | |
|---|---|---|---|
| 5,564,770 A | 10/1996 | Smith et al. | |
| 7,114,651 B2 | 10/2006 | Hjelmvik | |
| 7,382,280 B2 | 6/2008 | Long | |
| 7,427,094 B2 | 9/2008 | Marks et al. | |
| 7,731,088 B2 | 6/2010 | Moynihan et al. | |
| 7,843,321 B2 | 11/2010 | Marchasin et al. | |
| 7,950,570 B2 | 5/2011 | Marchasin et al. | |
| 7,988,046 B2 | 8/2011 | Moynihan et al. | |
| 8,219,442 B2 | 7/2012 | Johnson et al. | |
| 9,156,436 B2 | 10/2015 | Hopper | |
| 9,623,838 B1 | 4/2017 | Perri | |
| 10,513,242 B1* | 12/2019 | Heffron | H04W 4/029 |
| 2004/0068433 A1 | 4/2004 | Chatterjee et al. | |
| 2006/0151987 A1* | 7/2006 | Marks | B60R 25/016 |
| | | | 280/848 |
| 2007/0085704 A1 | 4/2007 | Long | |
| 2009/0289814 A1* | 11/2009 | Jarman | G07B 15/02 |
| | | | 340/933 |
| 2012/0193500 A1* | 8/2012 | Kniss | B25B 11/007 |
| | | | 248/363 |
| 2014/0210646 A1 | 7/2014 | Subramanya | |
| 2017/0124608 A1 | 5/2017 | Silverman | |
| 2017/0124774 A1 | 5/2017 | Silverman | |
| 2018/0077211 A1 | 3/2018 | Rose et al. | |
| 2018/0333865 A1* | 11/2018 | Bacci | B23Q 39/028 |
| 2019/0366975 A1* | 12/2019 | Heffron | B60R 25/1004 |
| 2020/0307511 A1* | 10/2020 | Heffron | B60R 25/23 |

FOREIGN PATENT DOCUMENTS

| | | |
|---|---|---|
| DE | 3248415 A1 | 7/1983 |
| EP | 1562801 B1 | 2/2006 |
| GB | 375801 A | 6/1932 |
| GB | 384578 A | 12/1932 |
| GB | 2091658 A | 8/1982 |
| GB | 2115751 A | 9/1983 |
| GB | 2255756 A | 11/1992 |
| GB | 2285420 A | 7/1995 |
| GB | 2395178 A | 5/2004 |
| WO | 9001999 | 3/1990 |

* cited by examiner

PARKING ENFORCEMENT SYSTEM

BACKGROUND

Wheel clamp devices are in common use today for dealing with improperly parked vehicles and/or parking enforcement issues. Wheel clamp devices are typically attached to the wheel of a parked vehicle by a wheel clamp operative, so as to prevent the owner of the vehicle from driving the vehicle away or moving the vehicle.

At the same time as deploying the wheel clamp device on the parked vehicle, the wheel clamp operative will usually display a notice in the window of the vehicle informing the owner that the vehicle is improperly parked and that the wheel clamp device will remain on the vehicle until such a time as applicable fees are paid. When the owner of the vehicle has contacted the appropriate authorities and paid the requisite fees, the wheel clamp operative is instructed to return to the vehicle to remove the wheel clamp device, after which the owner of the vehicle is free to move the vehicle.

One problem with existing wheel clamp devices is that, in order to be effective in preventing movement of the vehicle as well as strong and secure enough to prevent unauthorized removal of the wheel clamp device (by means of force or otherwise), the wheel clamp devices tend to be bulky and heavy. Furthermore, the complexity of many wheel clamp devices makes successful and secure deployment difficult to achieve for an inexperienced wheel clamp operative. In other instances, the wheel clamp operative can be forced to work in the flow of oncoming traffic in the event of deploying a wheel clamp device on a vehicle that is parked flush to an obstacle on one side of the vehicle, such as for example a curb. In still other instances, wheel clamp devices can be ineffective against large-wheeled vehicles such as trucks and buses.

It would be advantageous if parking enforcement systems could be improved.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the parking enforcement system.

The above objects as well as other objects not specifically enumerated are achieved by a parking enforcement system configured to impair the view of a driver through a windshield of a vehicle. The parking enforcement system includes a plurality of covering assemblies. Each of the covering assemblies has one or more suction assemblies configured for placement against a windshield of a vehicle. A pump assembly is configured for pneumatic communication with the one or more suction assemblies. The pump assembly is configured to develop a partial vacuum between the suction assemblies and the windshield. A release assembly is configured for pneumatic communication with the one or more suction assemblies. The release assembly has a servo motor configured to actuate release of the suction assemblies from the windshield.

There is also provided a parking enforcement system configured to impair the view of a driver through a windshield of a vehicle. The parking enforcement system includes a plurality of covering assemblies. Each of the covering assemblies has one or more suction assemblies configured for placement against a windshield of a vehicle. A pump assembly is configured for pneumatic communication with the one or more suction assemblies. The pump assembly is configured to develop suction between the suction assemblies and the windshield. A release assembly is configured for pneumatic communication with the one or more suction assemblies. A control module is in communication with the release assembly. A match of a release code stored in the control module and a user input release code is configured to actuate release of the suction between the suction assemblies and the windshield.

There is also provided a method of using a parking enforcement system configured to impair the view of a driver through a windshield of a vehicle. The method includes the steps of storing an initial release code in a control module of the parking enforcement system, deploying the parking enforcement system on a windshield of a vehicle, developing suction between a plurality of covering assemblies and the windshield, providing a release code to a user tasked with removing the parking enforcement system, entering the release code in the control module, comparing the stored release code with the input release code, initiating detachment of the parking enforcement system in the event of a match between the stored release code and the input release code, removing the parking enforcement system from the vehicle and generating a new stored release code.

Various objects and advantages of the parking enforcement system will become apparent to those skilled in the art from the following detailed description, when read in light of the accompanying drawings.

DETAILED DESCRIPTION OF THE INVENTION

The parking enforcement system will now be described with occasional reference to the specific embodiments. The parking enforcement system may, however, be embodied in different forms and should not be construed as limited to the embodiments set forth herein. Rather, these embodiments are provided so that this disclosure will be thorough and complete, and will fully convey the scope of the parking enforcement system to those skilled in the art.

Unless otherwise defined, all technical and scientific terms used herein have the same meaning as commonly understood by one of ordinary skill in the art to which the parking enforcement system belongs. The terminology used in the description of the parking enforcement system herein is for describing particular embodiments only and is not intended to be limiting. As used in the description of the parking enforcement system and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the parking enforcement system. Notwithstanding that the numerical ranges and parameters setting forth the broad scope of the parking enforcement system are approximations, the numerical values set forth in the specific examples are reported as precisely as possible. Any numerical values, however, inherently contain certain errors necessarily resulting from error found in their respective measurements.

In accordance with embodiments of the present invention, a parking enforcement system is provided. Generally, the parking enforcement system is secured to a windshield of a vehicle through suction formed by one or more suction assemblies. The parking enforcement system is removed from the windshield after a user input release code matches a stored release code and after a servo motor actuates release of the suction between the suction assemblies and the windshield. In the alternative, the suction between the suction assemblies and the windshield can be released by actuation of a release valve lock assembly.

The term "suction", as used herein, is defined to mean any force that, by a pressure differential, attracts an object to the region of lower pressure.

Figure 1:
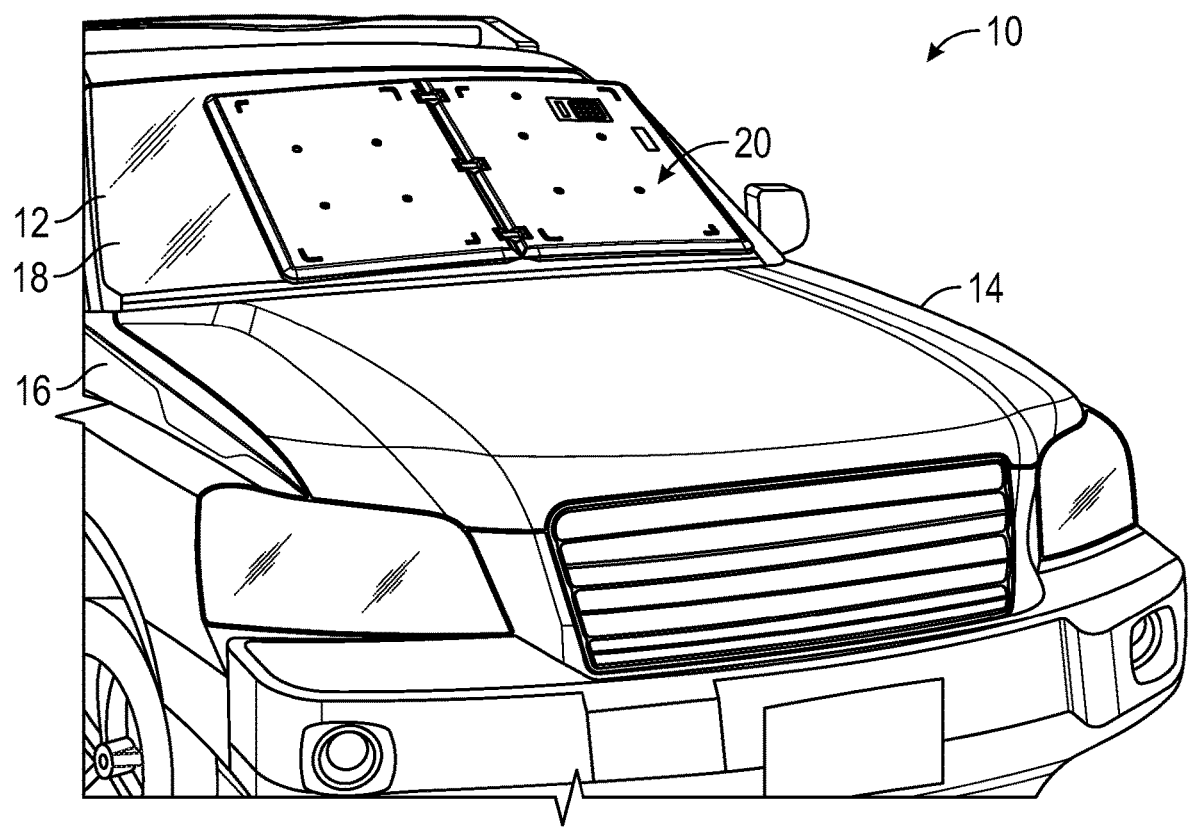
FIG. 1 is a simplified, perspective view of a vehicle equipped with a deployed parking enforcement system.

Referring now to the drawings, there is illustrated in FIG. 1 a diagrammatic and simplified view of a vehicle 10. The vehicle 10 is conventional in the art and includes a passenger compartment 12, configured for a driver (not shown) and optional passengers (not shown). The passenger compartment 12 is equipped with vehicle controls (not shown) including a steering mechanism, acceleration and braking devices. The steering mechanism, acceleration and braking devices are conventional in the art. When viewed from the driver's position within the passenger compartment 12, the vehicle 10 has a left side 14 and a right side 16. In the illustrated embodiment, the driver and the vehicle controls are positioned on the left side of the passenger compartment 12. However, in other embodiments, the driver and the vehicle controls can be positioned in other locations of the passenger compartment 12.

Referring again to FIG. 1, the vehicle 10 includes a windshield 18. The windshield 18 is configured to protect the occupants of the passenger compartment 12 during use of the vehicle 10 and further configured to provide the driver with a view of a path in front of the vehicle 10. The windshield 18 can have any desired construction, including the non-limiting example of a laminated construction and can have any desired shape, size and configuration, including the non-limiting examples of flat or curved surfaces.

Referring again to FIG. 1, the vehicle 10 is equipped with a parking enforcement system 20 (hereafter "system"). The system 20 is configured for attachment to an exterior surface 22 of the windshield 18. Generally, in an installed position, the system 20 is configured to impair the view of the driver through the windshield 18, such as to make it difficult for the driver to view the path in front of the vehicle 10.

Figure 2:
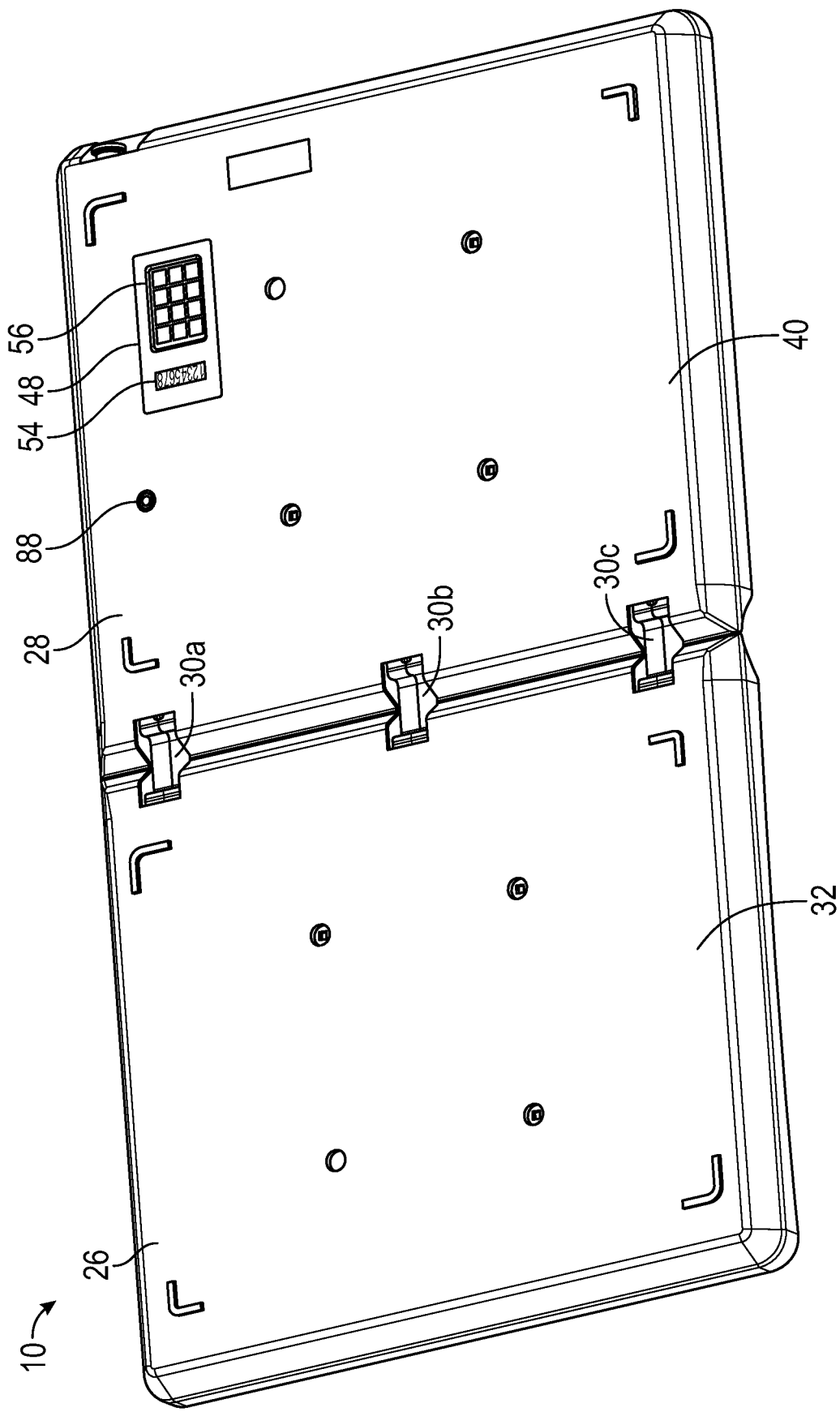
FIG. 2 is a top perspective view of the parking enforcement system of FIG. 1.
Figure 3:
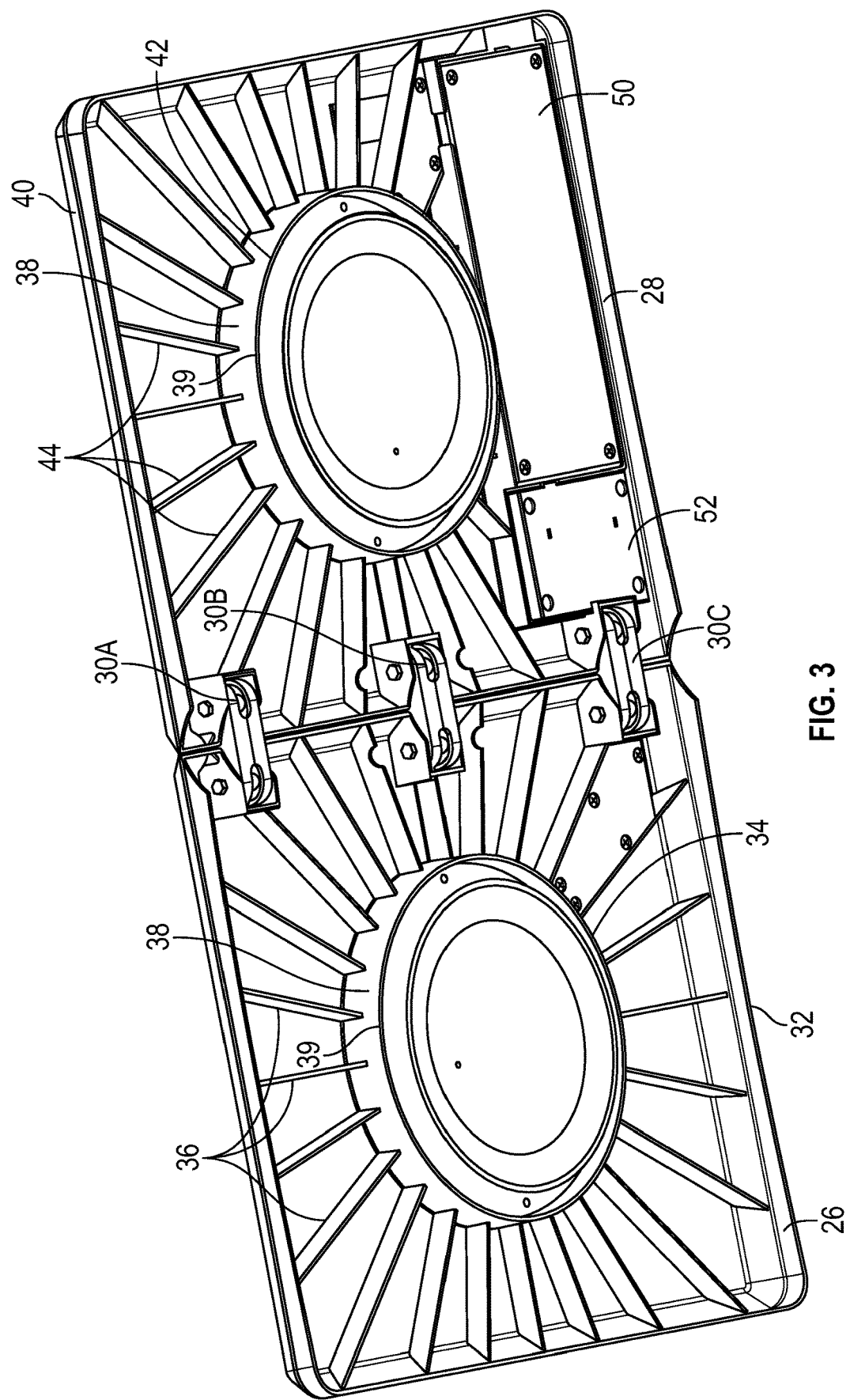
FIG. 3 is a bottom perspective view of the parking enforcement system of FIG. 1.

Referring now to FIGS. 2 and 3, the system 20 is illustrated. The system 20 includes a first covering assembly 26 connected to a second covering assembly 28 by a plurality of links 30A-30C. The system 20 is illustrated in FIGS. 2 and 3 in a deployed arrangement, that is, in the arrangement as installed on the exterior surface 22 of the windshield 18 as shown in FIG. 1. As will be discussed in more detail below, the links 30A-30C are configured to facilitate folding of the first and second covering assemblies 26, 28 into a stowed arrangement.

Referring again to FIGS. 2 and 3, the first covering assembly 26 includes an outer shell 32 configured to enclose and support a first suction assembly 34, positioned on an underside of the outer shell 32. Referring now to FIG. 3, optionally, the outer shell 32 can include a plurality of gussets 36 configured to support the first suction assembly 34. In the illustrated embodiment, the gussets 36 have a radial orientation. Alternatively, the gussets 36 can have other orientations, such as the non-limiting example of a circumferential orientation. However, it should be appreciated that the gussets 36 are optional and not required for operation of the system 20.

Referring again to FIGS. 2 and 3, the second covering assembly 28 includes an outer shell 40 configured to enclose and support a second suction assembly 42, positioned on an underside of the outer shell 40. Referring now to FIG. 3, optionally, the outer shell 40 can include a plurality of gussets 44 configured to support the second suction assembly 42. In the illustrated embodiment, the gussets 44 have a radial orientation. Alternatively, the gussets 44 can have other orientations, such as the non-limiting example of a circumferential orientation. However, it should be appreciated that the gussets 44 are optional and not required for operation of the system 20.

Referring now to FIG. 3, the first and second covering assemblies 26, 28 each include a support ring 38. The support ring 38 extends from the outer shell 32 to a rim 39. With the system 20 in a deployed arrangement, the rim 39 is configured for contact with the windshield 18. In this orientation, the support ring 38 is configured as a tamper resistant structure, that is, the support ring 38 is configured to prevent engagement of the first and second suction assemblies 34, 42 by a mechanism or device extending under the first and second covering assemblies 26, 28, for purposes of relieving the partial vacuum formed in the first and second suction assemblies 34, 42. In the illustrated embodiment, the support ring 38 and the rim 39 have a circular cross-sectional shape that extend circumferentially around the suction assemblies 34, 42. However, in other embodiments, the support ring 38 and the rim 39 can have other cross-sectional shapes sufficient to form a tamper resistant structure to prevent engagement of the first and second suction assemblies 34, 42.

Figure 4:
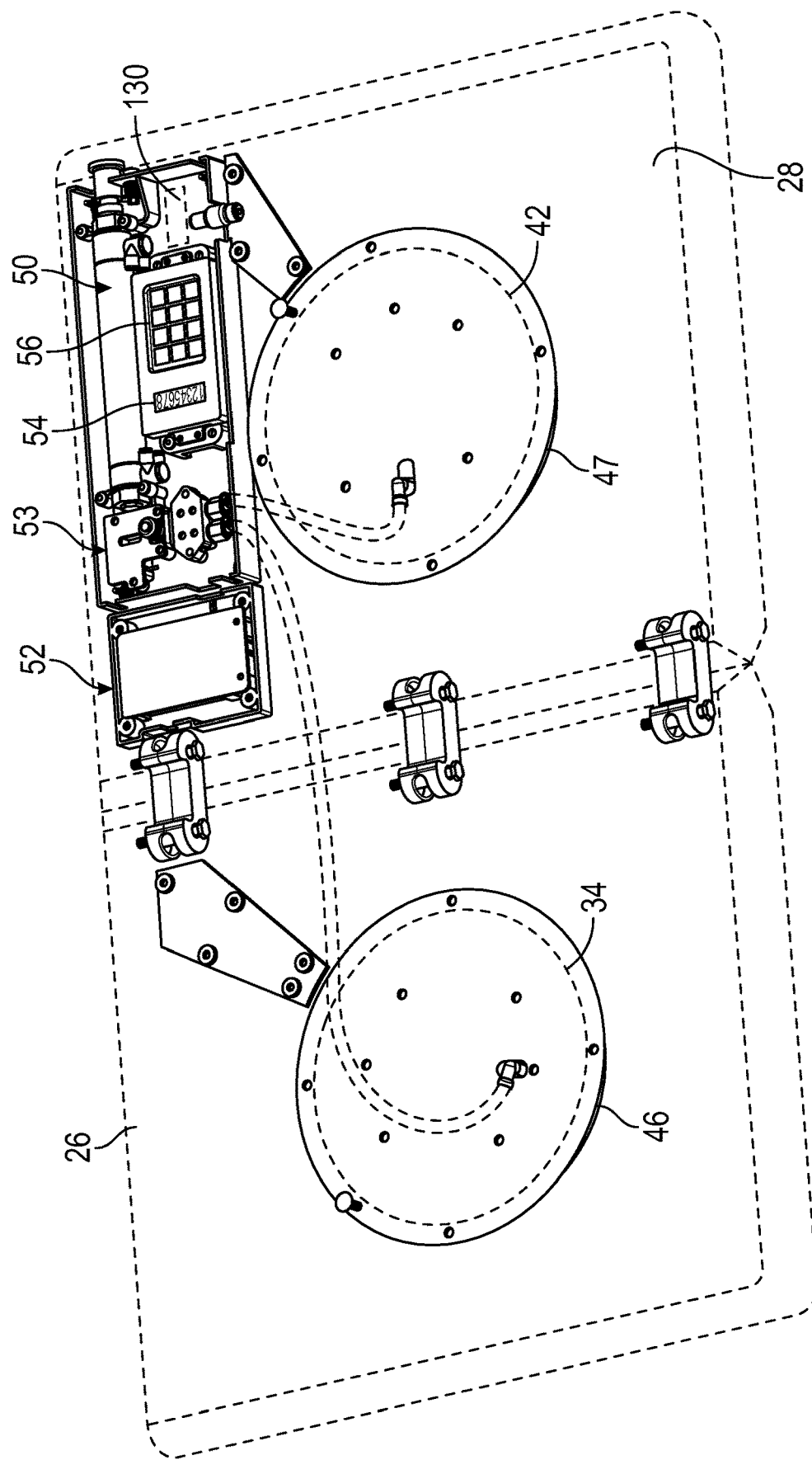
FIG. 4 is a top perspective view of the parking enforcement system of FIG. 1 shown without outer shells.

Referring now to FIG. 4, the first covering assembly 26 includes a plate 46 concentrically positioned between the outer shell 32 and the first suction assembly 34. The plate 46 is configured as a tamper resistant structure, that is, the plate 46 is configured to prevent engagement of the first and second suction assemblies 34, 42 by a mechanism or device extending through the outer shells 32, 40 of the first and second covering assemblies 26, 28, for purposes of relieving the partial vacuum formed in the first and second suction assemblies 34, 42. In the illustrated embodiment, the plate 46 has a circular cross-sectional shape that extend circumferentially around the suction assemblies 34, 42. However, in other embodiments, the plate 46 can have other cross-sectional shapes sufficient to form a tamper resistant structure to prevent engagement of the first and second suction assemblies 34, 42. In a similar manner, the second covering assembly includes a tamper resistant plate 47.

Figure 5:
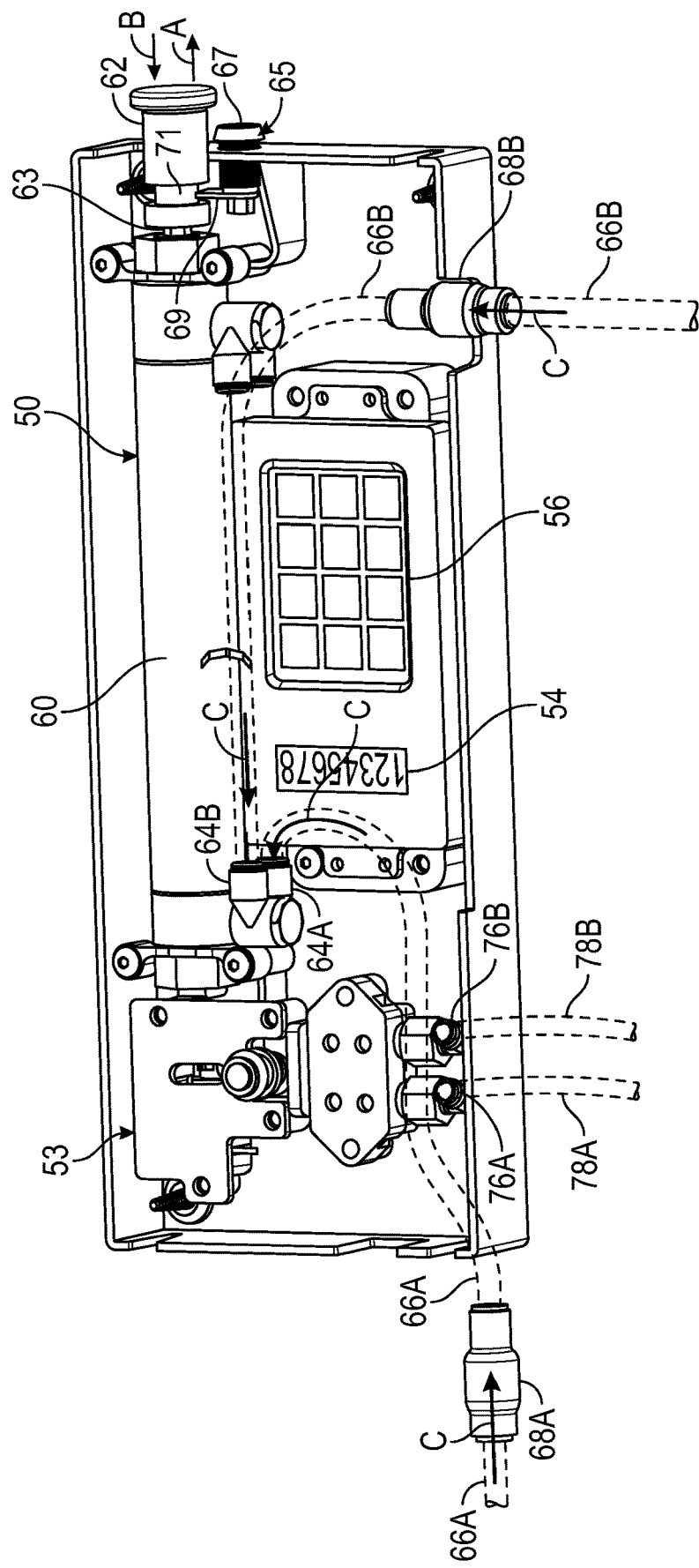
FIG. 5 is a perspective view of a display device, an input device, a pump assembly and a suction release assembly of the parking enforcement system of FIG. 1.

Referring now to FIGS. 2, 4 and 5, the second covering assembly 28 includes an input assembly 48, a pump assembly 50, a power supply assembly 52 and a suction release assembly 53. The input assembly 48 includes a display device 54, an input device 56, a control module (not shown) and a memory device (not shown). Generally, the input device 56 is configured for entry of a user-provided release code. In the illustrated embodiment, the input device 56 is an electronic keypad. One non-limiting example of a suitable input device 56 is the Membrane 3×4 Matrix Keypad, Model 419, manufactured by Adafruit Industries LLC, headquartered in New York City. However, in other embodiments, the input device 56 can be other structures, mechanisms and devices sufficient for entry of a user-provided release code, such as the non-limiting examples of numeric pads, touch screens and the like.

Referring now to FIGS. 2, 4 and 5, the display device 54 is in electrical communication with the input device 56 and is configured to illustrate the release code input by the user. In the illustrated embodiment, the display device 54 is an LCD-type type of screen configured to operation with low power requirements. One non-limiting example of a suitable display device 54 is the Lumex model LCD-S401C39TR, manufactured by Lumex Inc, headquartered in Carol Stream, Ill., 60188. While the embodiment of the display device 54 shown in FIGS. 2, 4 and 5 is described as an LCD-type of display, it should be appreciated that other display devices, sufficient to illustrate the release code input by the user, can be used.

Referring again to FIGS. 2, 4 and 5 and as will be discussed in more detail below, the memory device (not shown) is configured to store a previously provided system release code. The memory device can be any structure, mechanism or device sufficient to store a previously provided system release code, including the non-limiting example of a random access memory device.

Referring again to FIGS. 2, 4 and 5, the control module is in electrical communication with the input device 56 and the memory device and is configured to compare the user-entered release code with the system release code stored in the memory device. In the event the user-entered release code matches the system release code stored in the memory device, the control module is configured to initiate release of the system 20 from the windshield 18 of the vehicle 10. In the illustrated embodiment, the control module has the form of a microprocessor-based printed circuit board, containing software or code sufficient to compare the user-entered release code with the system release code. However, in other embodiments, the control module can have other desired forms, sufficient for the functions described above.

Referring again to FIG. 4, the power supply assembly 52 is configured for several functions. First, the power supply assembly 52 is configured to provide electrical power to the display device 54, the keyboard 56, the control module and the memory device. Second, the power supply assembly 52 is configured to provide electrical power to the suction release assembly 53 in order to initiate release of the system 20 from the windshield 18 of the vehicle 10. In the illustrated embodiment, the power supply assembly 52 includes a plurality of size AA batteries (not shown). However, in other embodiments, the power supply assembly 52 can have other desired forms, including the non-limiting examples of rechargeable batteries or an external power source (not shown). In still other embodiments, it is within the contemplation of the system 20 that the battery or batteries within the power supply assembly 52 can be charged by a plurality of solar cells (not shown) positioned within the system 20. The power supply assembly 52 can provide electrical power in any desired form, voltage or amperage sufficient to power the operations of the system 20.

Referring now to FIGS. 4 and 5, the pump assembly 50 is configured to produce a partial vacuum in the first and second suction assemblies 34, 42. In the illustrated embodiment, the pump assembly 50 includes a positive-displacement, hand-operated pump 60 having a handle 62 connected to an internal piston (not shown) and inlet ports 64A, 64B. The inlet port 64A is pneumatically connected to the first suction assembly 34 via pneumatic hose 66A. Pneumatic hose 66A includes a one-way valve 68A. The inlet port 64B is pneumatically connected to the second suction assembly 42 via pneumatic hose 66B. Pneumatic hose 66B includes a one-way valve 68B.

Referring now to FIG. 5, the handle 62 is connected to the internal piston by a rod 63. The pump assembly 50 is advantageously configured such than an outward movement of the handle 62, as indicated by direction arrow A, or an inward movement of the handle 62, as indicated by direction arrow B, draws air from the first and second suction assemblies 34, 42 through the hoses 66A and through the valves 68A, 68B, as indicated by direction arrows C. The drawn air flows through the inlet ports 64A 64B, through the pump 60 and is displaced to the outside. Repeated outward and inward movement of the handle 62 provides a partial vacuum in the first and second suction assemblies 34, 42. The partial vacuum in the first and second suction assemblies 34, 42 is used to secure the system 20 to the exterior surface 18 of the windshield 12.

Referring again to FIG. 5, one non-limiting example of a pump assembly 60 is the Bimba model DX, manufactured by Bimba Manufacturing, headquartered in University Park, Ill., 60484. While the embodiment shown in FIGS. 4 and 5 illustrate use of the positive-displacement, hand-operated dual-directional pump assembly 50 to provide a partial vacuum in the first and second suction assemblies 34, 42, it should be appreciated that in other embodiments, other structures, mechanisms and devices can be used to provide a partial vacuum in the first and second suction assemblies 34, 42, such as the non-limiting example of an electrically driven pump.

Referring again to FIG. 5, a pump handle release assembly 65 is configured to selectively allow operation of the pump assembly 60. The pump handle release assembly 65 includes a lock 67 and a cam 69. The lock 67 includes an internal lock shaft (not shown) configured for rotation upon activation by a key inserted into the lock 67. The cam 69 is connected to the lock shaft and is configured to rotate as the lock shaft rotates. The pump handle release assembly 65 is shown in a first position. In the first position, the cam 69 extends into a circumferential channel 71 formed in the handle 62, thereby preventing outward movement of the handle 62. Upon insertion and rotation of the key, the lock shaft and the cam 69 rotate from the first position to a second position. In the second position, the cam 69 rotates out of the circumferential channel 71, thereby allowing outward movement of the handle 62. In the illustrated embodiment, the lock 67 is a tubular pin tumbler lock (also known as an ace lock, circle pin tumbler lock, or radial lock). However, in other embodiments, the lock 67 can be other types of locks sufficient to selectively allow operation of the pump assembly 60.

Figure 6:
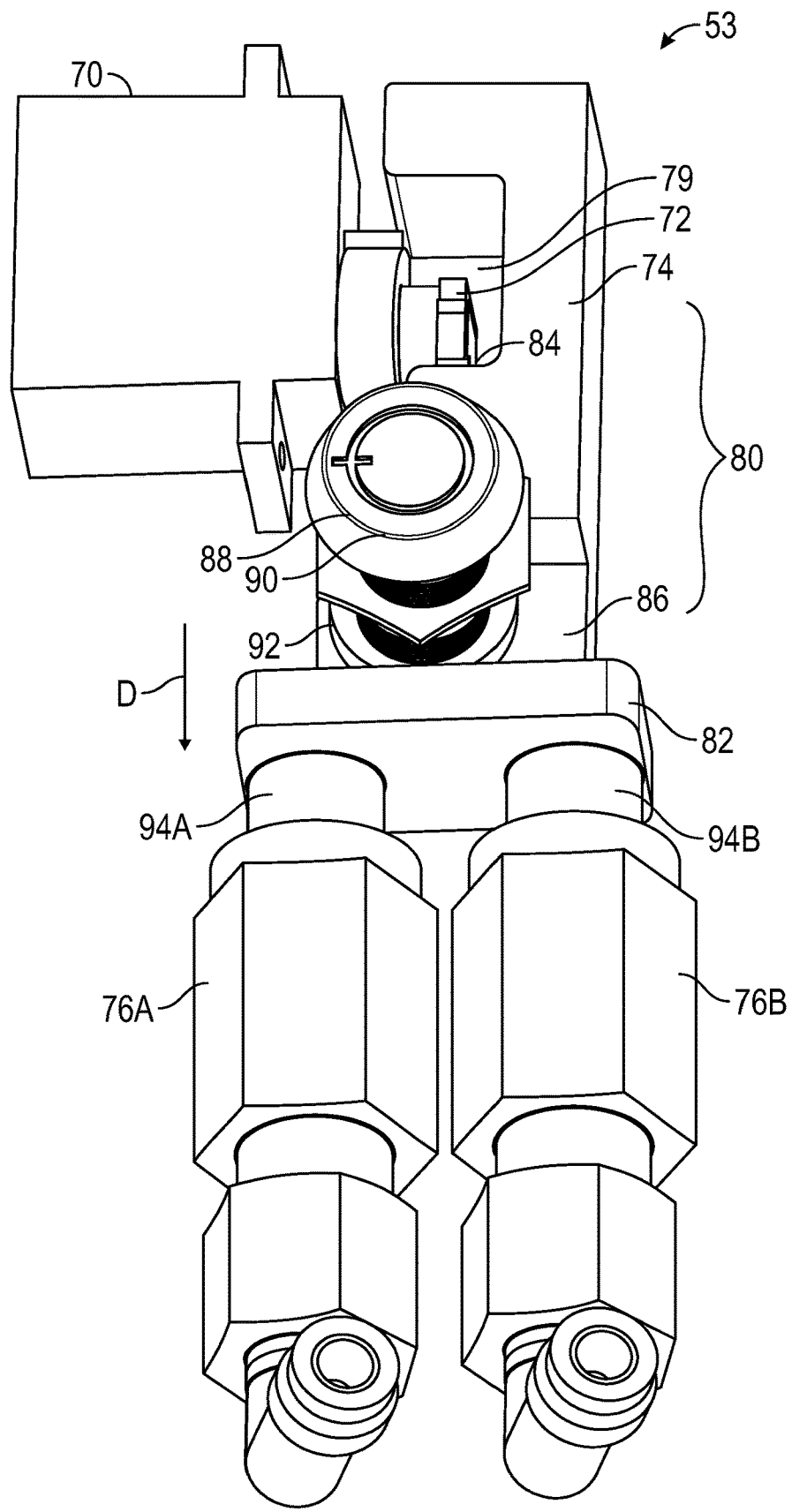
FIG. 6 is an enlarged perspective view of the suction release assembly of FIG. 5.

Referring now to FIGS. 5 and 6, the suction release assembly 53 is in pneumatic communication with the first and second suction assemblies 34, 42 and is configured to release the suction formed between the first and second suction assemblies 34, 42 and the exterior surface 22 of the windshield 18. The suction release assembly 53 includes a servo motor 70 equipped with a servo cam 72, a release slide 74, a plurality of release valves 76A, 76B. As shown in FIG. 5, the release valves 76A, 76B are in pneumatic communication with the first and second suction assemblies 34, 42 via pneumatic hoses 78A, 78*b*.

Referring now to FIG. 6, the servo motor 70 is in electrical communication with the control module (not shown) and the power supply assembly 52, and is configured to rotate a servo motor shaft (not shown) upon receiving an activation signal from the control module. One non-limiting example of a suitable servo motor is the Tower Pro Model SG92R, manufactured by Tower Pro PTE LTD, headquartered in Singapore. However, in other embodiments, other servo motors sufficient to rotate a servo motor shaft upon receiving an activation signal from the control module can be used.

Referring again to FIG. 6, the servo cam 72 is connected to the servo motor shaft such that rotation of the servo motor shaft results in rotation of the servo cam 72. The servo cam 72 is configured for selective contact with the release slide 74. In operation, upon receiving an activation signal from the control module, the servo motor 70 rotates the servo motor shaft, resulting in rotation of the servo cam 72. Rotation of the servo cam 72 against a portion of the release slide 74 results in movement of the release slide 74 in a direction toward the release valves (76A, 76B) as shown by direction arrow D. It should be appreciated that the servo cam 72 can have any desired cross-sectional profile sufficient to produce movement of the release slide 74 against the release valves (76A, 76B).

Referring again to FIG. 6, the release slide 74 includes an inlet portion 79 configured to receive the servo cam 72. The inlet portion 79 is defined at one end by an intermediate segment 80 that extends from the inlet portion 79 to an end wall 82. The intermediate segment 80 includes a first contact surface 84 and a recess 86. The first contact surface 84 is configured for contact with the servo cam 72. In operation, rotation of the servo cam 72 initially results in contact of the servo cam 72 with the first contact surface 84. Further rotation of the servo cam 72 results in the servo cam 72 forcing movement of the release slide 74 in a direction toward the release valves (76A, 76B) as shown by direction arrow D.

Referring again to FIG. 6, the recess 86 formed in the intermediate segment 80 of the release slide 74 is configured to receive a release valve lock assembly 88. The release valve lock assembly 88 is configured to selectively force movement of the release slide 74. The release valve lock assembly 88 includes a release lock 90 and a lock cam 92. The release lock 90 includes an internal lock shaft (not shown) configured for rotation upon activation by a key inserted into the release lock 90. The lock cam 92 is connected to the lock shaft and is configured to rotate as the lock shaft rotates. The release valve lock assembly 88 is shown in a first position. In the first position, the lock cam 92 extends radially into an area away from the end wall 82 of the release slide 74. In the first position, the lock cam 92 is not in contact with the release slide 74. Upon insertion and rotation of the key, the lock shaft and the lock cam 92 rotate from the first position to a second position. In the second position, the lock cam 92 contacts the end wall 82 of the release slid 74 such as to force movement of the release slide 74 in the direction toward the release valves 76A, 76B. In the illustrated embodiment, the release lock 90 is a tubular pin tumbler lock. However, in other embodiments, the release lock 90 can be other types of locks sufficient to selectively force movement of the release slide 74.

Referring again to FIG. 6, it should be appreciated that the lock cam 92 can have any desired cross-sectional profile sufficient to produce movement of the release slide 74 against the release valves (76A, 76B).

Referring again to FIG. 6, the end wall 82 extends to a location adjacent the release valves 76A, 76B and is shown in a first position. In the first position, the end wall 82 is configured to exert little or no force on the release valves 76A, 76B, thereby avoiding actuation of the release valves 76A, 76B. Upon movement of the release slide 74 in the direction D, the end wall 82 initially moves to contact release valve switches 94A, 94B. Further movement of the end wall 82 in the direction D serves to depress the release valve switches 94A, 94B, thereby actuating the release valves 76A, 76B. While the release slide 74 is illustrated in FIG. 6 as having the structure of an end wall 82, in other embodiments, the release slide 74 can include other structures, mechanisms and devices configured to depress the release valve switches 94A, 94B and actuate the release valves 76A, 76B.

Referring again to FIGS. 5 and 6, the release valves 76A, 76B are configured for several functions. First, the release valves 76A, 76B are configured to receive the pneumatic hoses 78A, 78B originating with the first and second suction assemblies 34, 42. Second, the release valves 76A, 76B are configured for pneumatic communication with the first and second suction assemblies 34. Third, the release valves 76A, 76B are configured to release the suction created in the first and second suction assemblies 34. The suction in the first and second suction assemblies 34 can be relieved in two different manners. In a first manner, the release valves 76A, 76B can be actuated by movement of the release slide 74 against the release valve switches 94A, 94B as caused by rotation of the servo cam 72, resulting from electrical communication between the control module and the servo motor 70. In a second manner, the release valves 76A, 76B can be actuated by movement of the release slide 74 against the release valve switches 94A, 94B as caused by rotation of the lock cam 92, resulting from manual rotation of the release lock 90.

Referring again to embodiment illustrated in FIG. 6, the release valves 76A, 76B are push button style of pneumatic valve. That is, the release valves 76A, 76B are configured to be normally closed and opened only upon depression of the release valve switches 94A, 94B. One non-limiting example of a suitable release valve is the push button valve model PB2NC-B, manufactured by Specialty Manufacturing Company, headquartered in St. Paul, Minn. However, in other embodiments, other release valves sufficient to be normally closed and opened only upon depression of the release valve switches 94A, 94B can be used.

Referring again to FIG. 3, the first and second suction assemblies 34, 42 are illustrated. The first and second suction assemblies 34, 42 include a flexible rubber suction cup (such flexible rubber suction cup are commonly used in the glazing industry for the moving of panes of glass). One non-limiting example of a suitable suction assembly is the suction assembly of the type disclosed in U.S. Pat. No. 7,427,094 to Marks et al., which is hereby incorporated by reference, in its entirety. However, other suction assemblies, sufficient to secure the system 20 to the exterior surface 18 of the windshield 12 can be used.

Referring again to FIG. 3, while the illustrated embodiment shows a quantity of one suction assembly for each covering assembly 26, 28, it is within the contemplation of this disclosure that each covering assembly 26, 28 can be equipped with more than one suction assembly.

Figure 7:
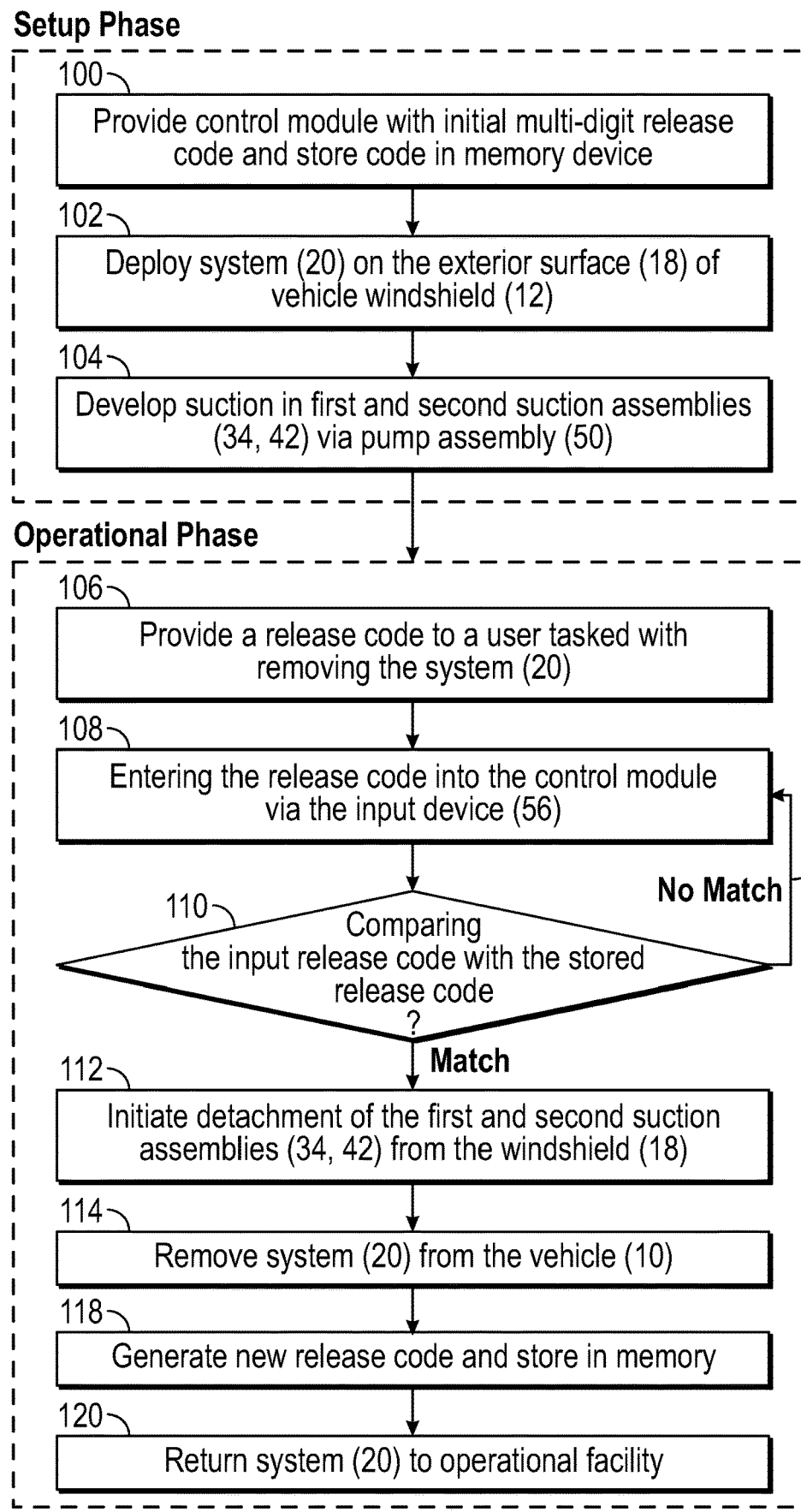
FIG. 7 is a flow chart illustrating steps in the setup and operation of the parking enforcement system of FIG. 1.

Referring now to FIG. 7, the setup and operation of the system 20 will be described. In an initial setup step 100, an initial multi-digit release code is input into the control module with the input device 56. The initial multi-digit release code is stored in the memory device and continuously displayed on the display device 54. As will be discussed in more detail below, the initial multi-digit release code is used to identify the specific system 20. In a next setup step 102, the system 20 is deployed on the exterior surface 18 of vehicle windshield 12. In this step, the first and second suction assemblies 34, 42 are without suction, that is, the components within the system 20 are at atmospheric pressure. In a final setup step 104, the system 20 is secured to the exterior surface 18 of the vehicle windshield 12 by developing suction in the first and second suction assemblies 34, 42. The suction is developed by the pump assembly 50 and conveyed to the first and second suction assemblies via the pneumatic hoses 66A, 66B.

Referring again to FIG. 7 in a first operational step 106, in the event it is desired to remove the system 20, a user tasked with removing the system 20 notes the initial multi-digit release code displayed on the display device 54. Using the initial multi-digit release code as a system identifier, the user obtains a release code from an operational facility. After proper authorization, the release code can be provided to the user via different manners, including the non-limiting examples of a payment receipt, e-mail, text message and the like. It is also within the contemplation of the system 20, that the user can obtain the release code via an internet-based application (web app) or a mobile application. By providing the release code directly to the user, the release code is not provided to the display device 54, input device 56, control module or memory device. In a next operational step 108, the user enters the release code into the control module via the input device 56. Optionally, the user can view the input release code via the display device 54, although such is not necessary for operation of the system 20. In a next operational step 110, the control module compares the input release code with the stored release code. In a next operation step 112, upon a match of the input release code with the stored release code, detachment of the system 20 from the windshield 18 is initiated. This step includes the action of removing the suction formed between the first and second suction assemblies 34, 42 and the exterior surface 18 of the windshield using the suction release assembly 53. In a next operational step 114, the system 20 is removed from the vehicle 10.

Referring again to FIG. 7 and operation step 110, in the event the input release code does not match the stored release code, in a next step 116, the user is returned to operational step 110 to re-input the release code.

In a next operational step 118, once the control module determines a match between the input release code and the stored release code, and the system 20 is removed from the windshield 18, the control module is configured to generate a new release code that is stored in the memory device. The newly generated release code supersedes the previously stored release code. The system 20 is then ready for a new deployment.

In a final step 120, the user returns the system 20 to an operational facility. It is contemplated that the user may have a defined time in which to return the system 20 to the operational facility. For example, it is contemplated that the user may have a time limit of 24.0 hours in which to make the return. In the event, the system 20 is not returned, the user may be assessed penalties, such as the non-limiting example of further financial charges.

Referring again to FIG. 4, the system 20 can include an alarm assembly, shown schematically at 130. The alarm assembly 130 is configured to sense movement and/or vibration of a deployed system 20 and further configured to provide notification of the movement and/or vibration. In the illustrated embodiment, the alarm system includes an accelerometer (not shown) configured to sense movement and/or vibration of the deployed system 20. However, in other embodiments, other structures, mechanisms and devices can be used. The alarm system 130 further includes a visual and/or audio indicator (not shown). The visual and/or audio indicator is configured to provide continuous visual and/or indications of movement and/or vibration of the system 20. Non-limiting examples of visual indicators include a flashing strobe-style of light, flashing colored lights and interrupted beams of light formed by one or more lasers. Non-limiting examples of audio indicators include beeping sounds, alarms, sirens and the like. The beeping sound can have any desired and suitable tone, pulse and volume.

Figure 8:
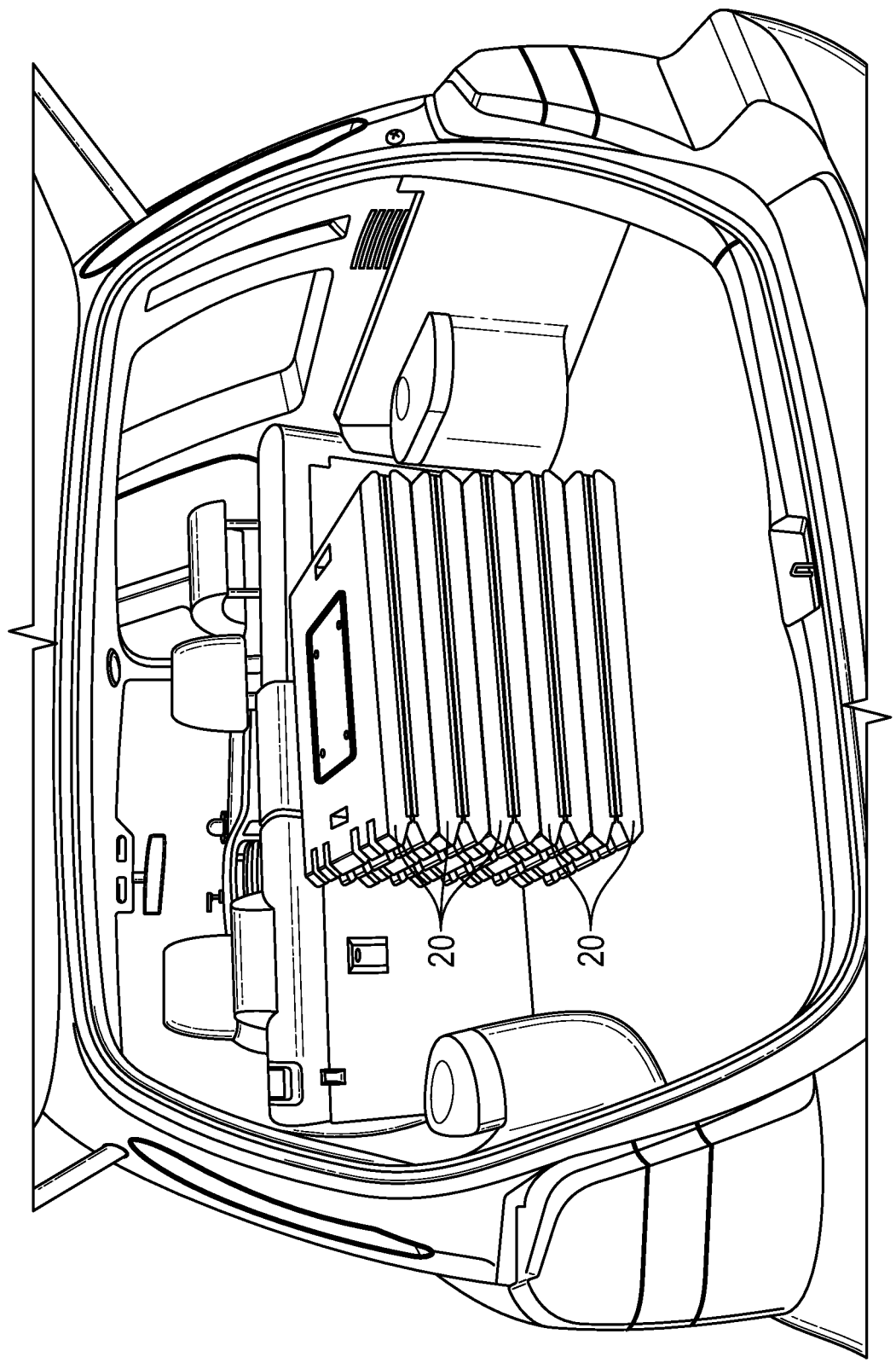
FIG. 8 is a perspective view of a plurality of parking enforcement systems of FIG. 1 shown in a folded and stacked arrangement.

Referring again to FIG. 2 and as described above, the system 20 is illustrated in a deployed arrangement, that is, each of the first and second covering assemblies 26, 28 are installed on the exterior surface 22 of the windshield 18, as shown in FIG. 1. However, it is within the contemplation of the system 20, that the covering assemblies 26, 28 can be positioned in a folded arrangement for storage and transportation purposes. Referring now to FIG. 8, a plurality of systems 20 are shown in a folded and stacked arrangement. The folded arrangement includes rotating the first and second covering assemblies 26, 28 about the links 30A-30C such that the interior portions of the first and second covering assemblies 26, 28 contact and seat each other. In the folded arrangement, the outer shells 32, 40 of the first and second covering assemblies 26, 28 advantageously provide protection of the system 20 against environmental elements and physical abuse.

In the embodiment of the system 20 described above and illustrated in FIGS. 1-4, the system 20 includes first and second covering assemblies 26, 28 rotatably connected together by a plurality of links 30A-30C. However, it should be appreciated that in other embodiments, the first and second covering assemblies 26, 28 can have other connective structures configured to facilitate a deployed and a stowed arrangement. As one non-limiting example, it is contemplated that the first and second covering assemblies 26, 28 can include mechanisms facilitating a sliding arrangement, such that the first and second covering assemblies 26, 28 "nest" or seat upon each other for storage and transportation purposes. In still other embodiments, it is contemplated that the first and second covering assemblies 26, 28 can be oriented in a telescoping arrangement, such that either of the first and second covering assemblies 26, 28 extends from the other covering assembly.

Figure 9:
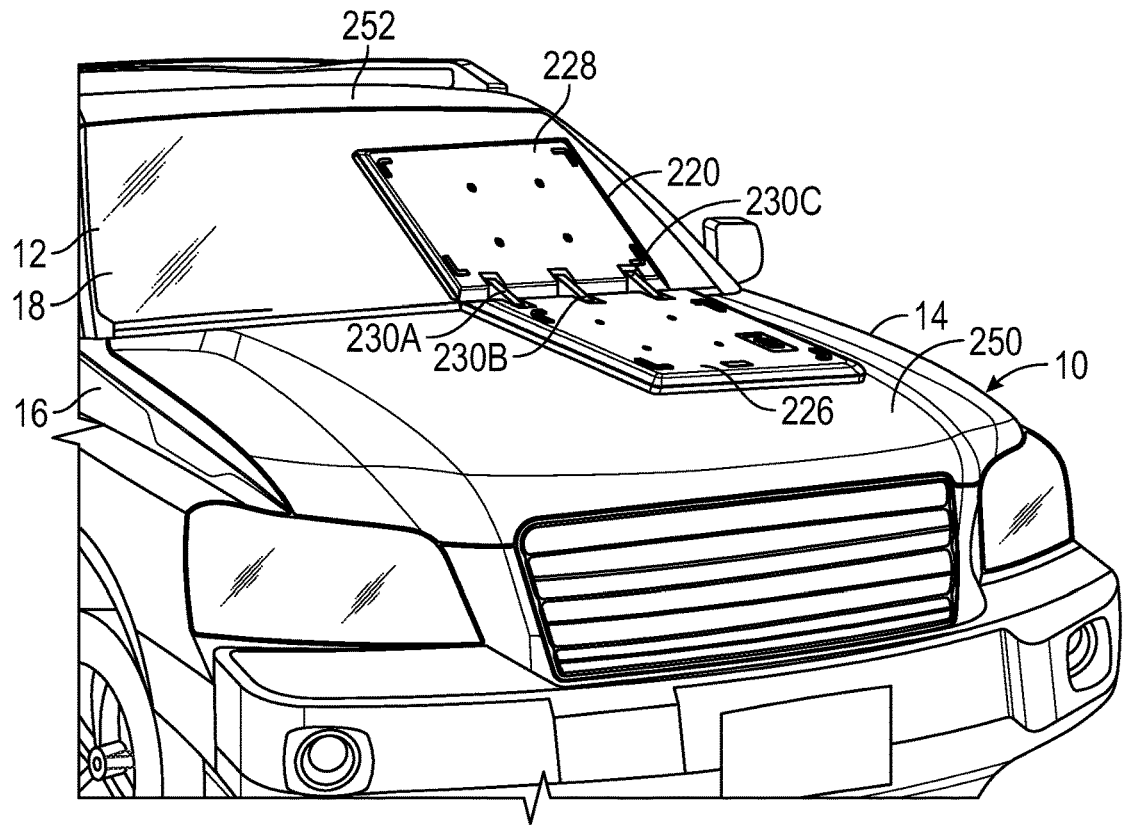
FIG. 9 is a simplified, perspective view of a vehicle equipped with a second embodiment of a parking enforcement system.

In the embodiment of the system 20 described above and illustrated in FIG. 1, the system 20 is secured to a windshield 18 of a vehicle 10 through suction formed by one or more suction assemblies and configured to impair the view of the driver through the windshield 18. However, it should be appreciated that the system can be deployed in other manners sufficient to impair the view of the driver through the windshield 18. Referring now to FIG. 9, a system 210 is illustrated having first and second covering assemblies 226, 228 connected together by links 230A-230C. In the illustrated embodiment, the covering assemblies 226, 228 and the links 230A-230C are the same as, or similar to, the covering assemblies 26, 28 and the links 30A-30C described above and illustrated in FIG. 2. In this embodiment, the first covering assembly 226 is secured to an engine hood 250 through suction formed by one or more suction assemblies in the first covering assembly 226 and the second covering assembly 228 is secured to the windshield 18 through suction formed by one or more suction assemblies in the second covering assembly 228. Deployment and operation of the system 220 is the same as described above for system 20.

Referring again to FIG. 9, it should be appreciated that the first covering assembly 226 can be deployed to other areas of the vehicle 10, such as for example, a driver side window (not shown) or a top 252 of the passenger compartment 12 sufficient to allow the second covering assembly 228 to be secured to the windshield 18.

Figure 10:
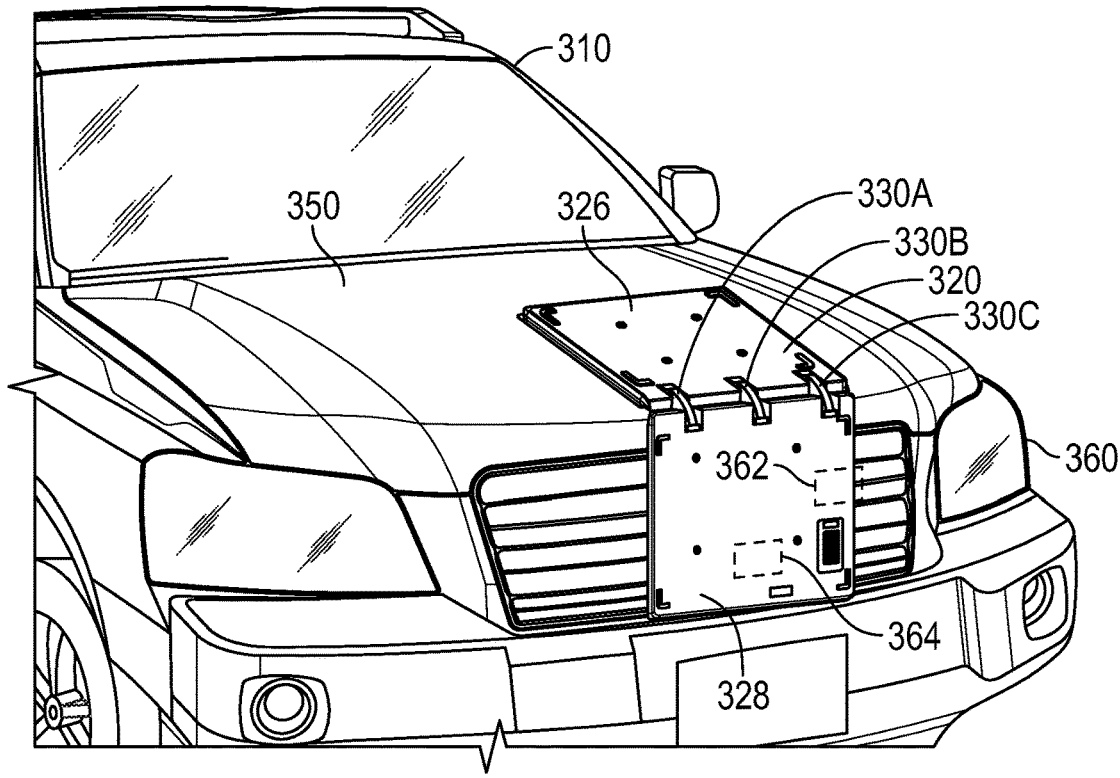
FIG. 10 is a simplified, perspective view of a vehicle equipped with a third embodiment of a parking enforcement system.

In the embodiments of the system 20, 220 described above and illustrated in FIGS. 1 and 9 show use of the system 20 to impair the view of the driver through the windshield 18, it is further contemplated that a system can be used for driverless or autonomous vehicle applications. Referring now to FIG. 10, a driverless vehicle 310 is illustrated. The autonomous vehicle 310 includes a front portion 360 extending in the direction of forward travel. The front portion 360 can include one or more sensors, shown schematically at 362, 364. The sensors 362, 364 can include detection technologies such as sonar devices, stereo cameras, lasers, and radar and can be used for operation of the autonomous vehicle 310, including operations such as lane departure warnings, collision avoidance and blind spot monitoring. A system 320 is illustrated having first and second covering assemblies 326, 328 connected together by links 330A-330C. In the illustrated embodiment, the covering assemblies 326, 328 and the links 330A-330C are the same as, or similar to, the covering assemblies 26, 28 and the links 30A-30C described above and illustrated in FIG. 2. In this embodiment, the first covering assembly 326 is secured to an engine hood 350 through suction formed by one or more suction assemblies in the first covering assembly 326 and the second covering assembly 328 is secured to the front portion 360 through suction formed by one or more suction assemblies in the second covering assembly 328. Deployment and operation of the system 320 is the same as described above for system 20.

While the embodiments of the systems 20, 220 and 320 have been described above and shown in the Figures as securing the first and second covering assemblies to portion of a vehicle with the force created by a partial vacuum, it should be appreciated that in other embodiments, forces created by other physical phenomena can be used. Non-limiting examples of other forces include magnetic forces, electrodynamic forces, intermolecular forces and the like.

The principle and mode of operation of the parking enforcement system have been described in the illustrated embodiments. However, it should be noted that the parking enforcement system may be practiced otherwise than as specifically illustrated and described without departing from its scope.

What is claimed is:

1. A parking enforcement system configured to impair the view of a driver through a windshield of a vehicle, comprising:
   a plurality of covering assemblies, each of the covering assemblies having one or more suction assemblies configured for placement against a windshield of a vehicle;
   a pump assembly configured for pneumatic communication with the one or more suction assemblies, the pump assembly configured to develop a partial vacuum between the suction assemblies and the windshield; and
   a release assembly configured for pneumatic communication with the one or more suction assemblies, the release assembly having a servo motor configured to actuate release of the suction assemblies from the windshield, the release assembly having a rotatable servo cam attached to a shaft of the servo motor and configured to move a release slide, the release slide includes an end wall configured to actuate release valves.

2. The parking enforcement system of claim 1, wherein the release assembly is configured to release the partial vacuum between the suction assemblies and the windshield.

3. The parking enforcement system of claim 1, wherein the release valves are push button valves.

4. The parking enforcement system of claim 1, wherein the release assembly is in electrical communication with a control module.

5. The parking enforcement system of claim 1, wherein the release assembly includes a release valve lock assembly.

6. The parking enforcement system of claim 5, wherein the release valve lock assembly is configured for manual operation.

7. The parking enforcement system of claim 6, wherein the release valve lock assembly includes a lock cam configured to move a release slide.

8. The parking enforcement system of claim 1, wherein the system includes an alarm assembly configured to detect movement or vibration of the system.

9. The parking enforcement system of claim 1, wherein the covering assemblies include tamper resistant plate configured to prevent engagement of the suction assemblies by a mechanism or device extending through an outer shell of the covering assemblies.

10. A parking enforcement system configured to impair the view of a driver through a windshield of a vehicle, comprising:
    a plurality of covering assemblies, each of the covering assemblies having one or more suction assemblies configured for placement against a windshield of a vehicle;
    a pump assembly configured for pneumatic communication with the one or more suction assemblies, the pump assembly configured to develop a partial vacuum between the suction assemblies and the windshield; and
    a release assembly configured for pneumatic communication with the one or more suction assemblies, the release assembly having a servo motor configured to actuate release of the suction assemblies from the windshield,
    wherein the covering assemblies include a tamper resistant support ring configured to prevent engagement of the suction assemblies by a mechanism or device extending under the covering assemblies for purposes of relieving the partial vacuum formed in the suction assemblies.

11. A method of using a parking enforcement system configured to impair the view of a driver through a windshield of a vehicle, the method comprising the steps of:

storing an initial release code in a control module of the parking enforcement system;

deploying the parking enforcement system on a windshield of a vehicle;

developing suction between a plurality of covering assemblies and the windshield;

providing a release code to a user tasked with removing the parking enforcement system;

entering the release code in the control module;

comparing the stored release code with the input release code;

initiating detachment of the parking enforcement system in the event of a match between the stored release code and the input release code;

removing the parking enforcement system from the vehicle; and generating a new stored release code.

12. The method of claim 11, wherein the covering assemblies include one or more suction assemblies.

13. The method of claim 12, including the step of removing the suction between a plurality of covering assemblies and the windshield in the event of a match between the stored release code and the input release code.

14. The method of claim 13, including the step of removing the suction by opening a push button valve in pneumatic communication with the one or more suction assemblies.

15. The method of claim 14, including the step of opening the push button valve with a servo motor.

16. The method of claim 15, including the step of opening the push button valve with a servo motor after receiving communication from the control module.

* * * * *